(12) United States Patent
Leschinger et al.

(10) Patent No.: US 6,462,269 B1
(45) Date of Patent: Oct. 8, 2002

(54) DATA TRANSMISSION PEDESTAL WITH INTERNAL SERVICE LINE PASSAGE

(75) Inventors: Matthew Leschinger, Wheaton; Lawrence Dolan, Carol Stream, both of IL (US); Derak Polk; Alfred Redmond, both of Greenville, MS (US)

(73) Assignee: Marconi Communications, Inc., Cleveland, OH (US)

( * ) Notice: Subject to any disclaimer, the term of this patent is extended or adjusted under 35 U.S.C. 154(b) by 0 days.

(21) Appl. No.: 09/900,270

(22) Filed: Jul. 6, 2001

(51) Int. Cl.[7] .................................................. H02G 9/00
(52) U.S. Cl. .................. 174/38; 174/39; 52/3
(58) Field of Search ............................. 174/37, 38, 39, 174/17 R, 17 CT, 58, 60, 59, 68.3, 101, 69; 220/3.3, 3.8; 361/664; 52/3; 138/115, 112, 113

(56) References Cited

U.S. PATENT DOCUMENTS

| | | | | |
|---|---|---|---|---|
| 3,872,234 A | * | 3/1975 | Smith | 174/38 |
| 3,928,713 A | * | 12/1975 | Davis | 174/17 R |
| 4,751,610 A | * | 6/1988 | Nickola | 361/664 |
| 4,888,448 A | * | 12/1989 | Moerman | 174/38 |
| 4,892,978 A | * | 1/1990 | Axworthy | 174/38 |
| 5,184,279 A | * | 2/1993 | Horn | 174/39 X |
| 5,384,417 A | * | 1/1995 | Volk et al. | 174/37 X |
| 6,008,452 A | * | 12/1999 | Lux, Jr. | 174/37 |
| 6,198,041 B1 | | 3/2001 | Leschinger et al. | |
| 6,316,722 B1 | * | 11/2001 | Low et al. | 174/38 |

FOREIGN PATENT DOCUMENTS

AU        52691        * 12/1976 ................... 174/38

* cited by examiner

Primary Examiner—Dean A. Reichard
Assistant Examiner—Dhiru R Patel
(74) Attorney, Agent, or Firm—Jones, Day, Reavis & Pogue

(57) ABSTRACT

A data transmission pedestal housing having a service line passage is disclosed. The passage is structured to have a gap allowing service lines to pass into and out of the service line passage. An extruded gap closure element is provided for sliding engagement with walls of the passage so as to close and open the gap. When the gap is opened, a service line may pass out of the passage through the gap thereby allowing the pedestal housing to be removed and replaced without disconnecting the service lines from terminal blocks that connect to a cable.

14 Claims, 3 Drawing Sheets

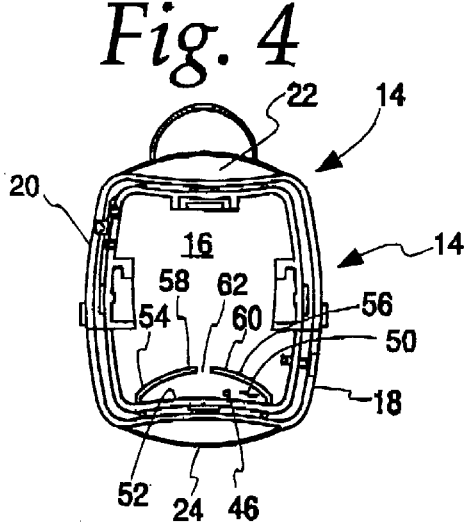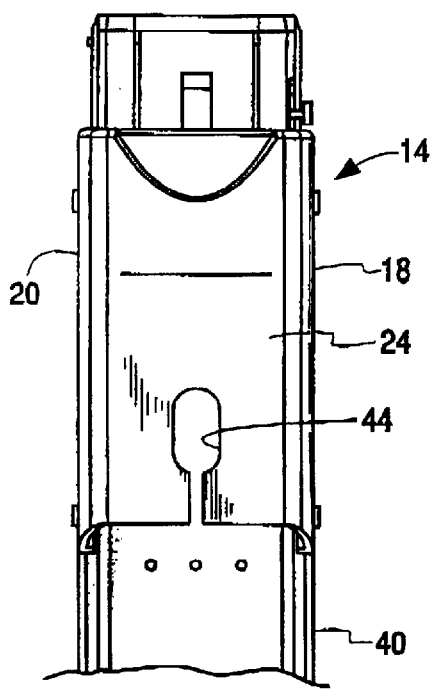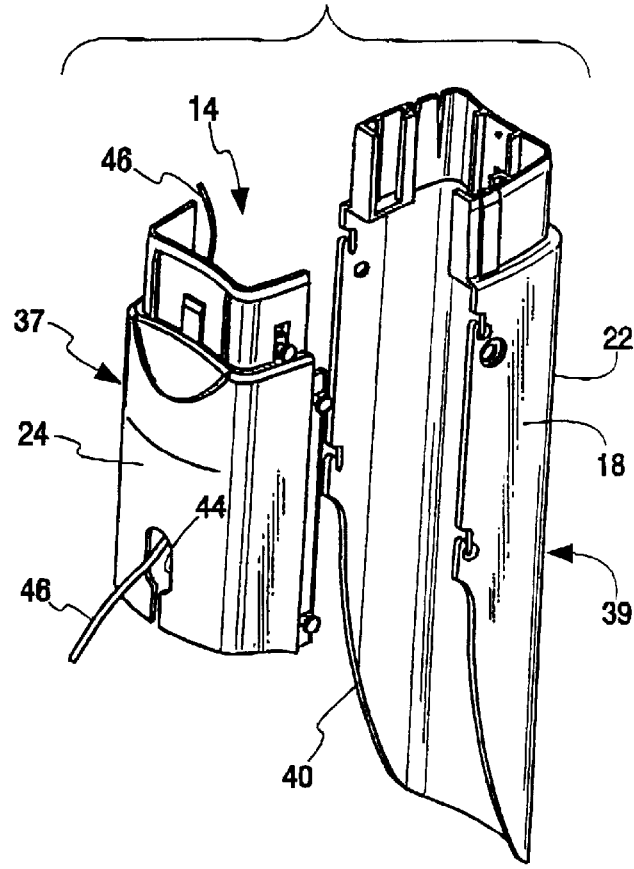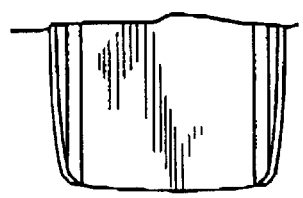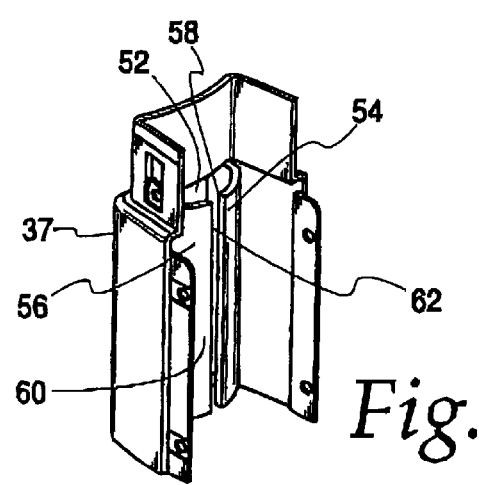

DATA TRANSMISSION PEDESTAL WITH INTERNAL SERVICE LINE PASSAGE

BACKGROUND OF THE INVENTION

1. Field of the Invention

The present invention relates to a data transmission pedestal with an internal service line passage and more particularly to a pedestal with an internal service line passage that may be easily opened and closed.

2. Description of the Related Art

Data transmission lines connect central distribution offices to customer locations usually through buried underground cable. In close vicinity to a customer's location, the data transmission cable is brought above ground where preselected lines of the cable are connected to underground service lines from a customer, which lines are also brought above ground. The appropriate cable lines and service lines are connected by the use of terminal blocks mounted to grounded frames. These above-ground connections are covered by a pedestal to protect the connections against weather and other environmental factors as well as against tampering and vandalism. The pedestal may be opened to facilitate service of the lines and cable by technicians when such service is needed.

From time to time a pedestal must be replaced or serviced due to vandalism, accident or inclement weather. When this need arises the lines must be disconnected from the terminal blocks mounted within the pedestal. This is time consuming and expensive and also disrupts service to customers.

BRIEF SUMMARY OF THE INVENTION

The difficulties encountered with existing pedestals and equipment have been overcome by the present invention. What is described here is a pedestal assembly comprising an elongated housing having upper and lower portions and an interior chamber for data transmission equipment, a service line passage formed within the interior chamber bounded by an interior surface of the housing and two interior walls connected to and extending from the interior surface of the housing, the two interior walls having ends which are separated from one another by a longitudinally extending gap, and a removable gap closure element for spanning the longitudinally extending gap and for selectively closing and opening the gap.

There are a number of advantages, features and objects achieved with the present invention which are believed not to be available in prior related devices. For example, one advantage is that the present invention provides a data transmission pedestal which allows the removal of service lines from a partitioned internal passage and their placement in the main part of the interior chamber of the pedestal without disconnection of the service lines from connected terminal blocks. Another object of the present invention is to provide a pedestal which allows its removal from a connected cable and service lines without disconnecting any of the lines from terminal blocks within the pedestal. A further advantage of the present invention is to provide a pedestal having a partitioned internal passage that is simple, reliable and relatively inexpensive. Yet another object of the present invention is to provide a pedestal having a separated internal service passage for service lines where the passage is closed during normal use of the pedestal, but where the passage may be easily and quickly opened to allow removal of the service lines.

A more complete understanding of the present invention and other objects, advantages and features thereof will be gained from a consideration of the following description of the preferred embodiment read in conjunction with the accompanying drawing provided herein.

BRIEF DESCRIPTION OF THE SEVERAL VIEWS OF THE DRAWING

FIG. 2 is a front elevation view of a base section of the pedestal shown in FIG. 1.

FIG. 3 is an exploded front isometric view of the base section of the pedestal shown in FIGS. 1 and 2.

FIG. 4 is a top plan view of the base section of the pedestal shown in FIG. 2 with an open service wire passage.

FIG. 5 is a rear isometric view of a front part of the base section of the pedestal shown in FIG. 3.

DETAILED DESCRIPTION OF THE INVENTION

Figure 1:
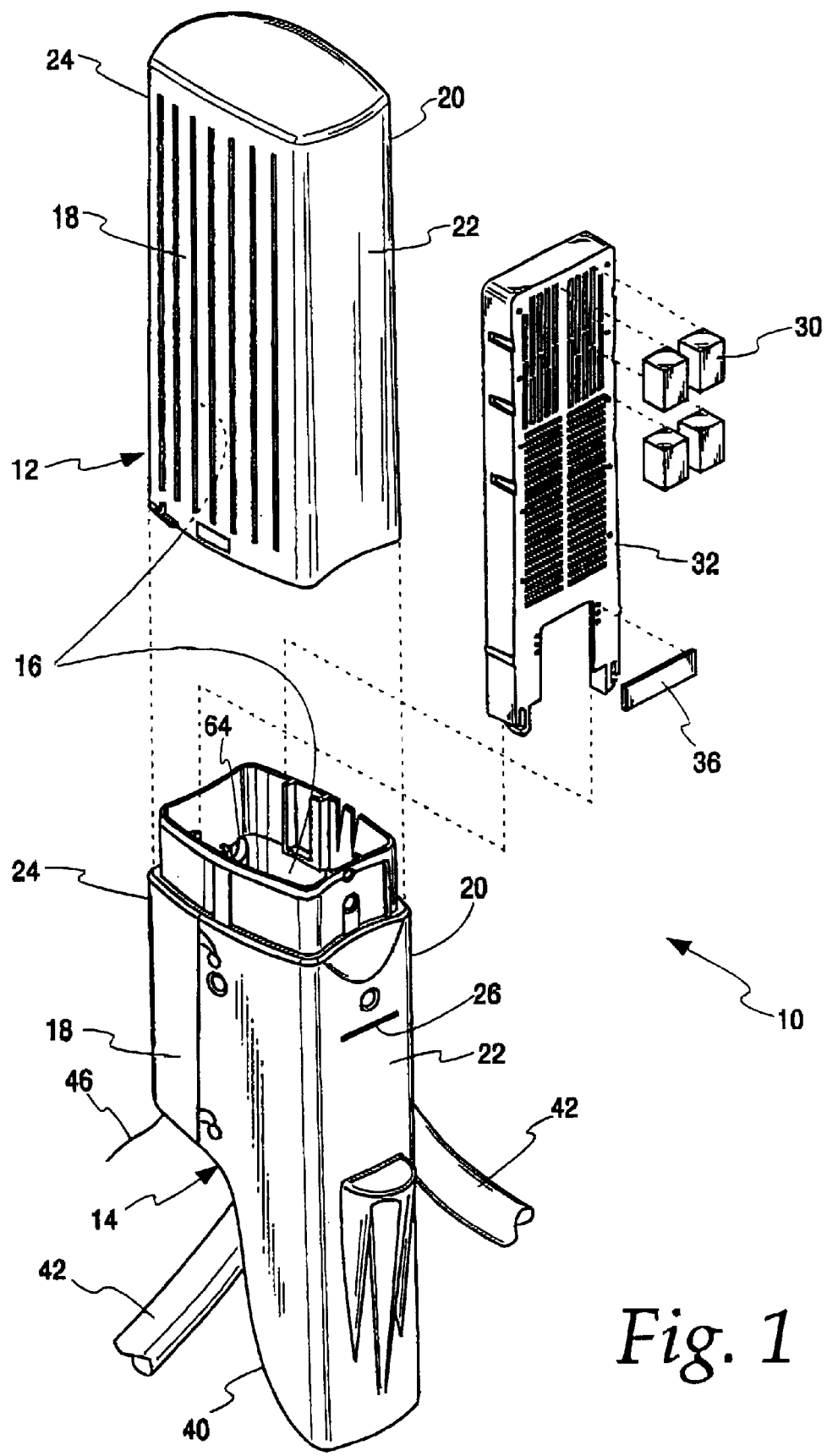
FIG. 1 is a rear isometric exploded view of a data transmission pedestal of the present invention.
Figure 6:
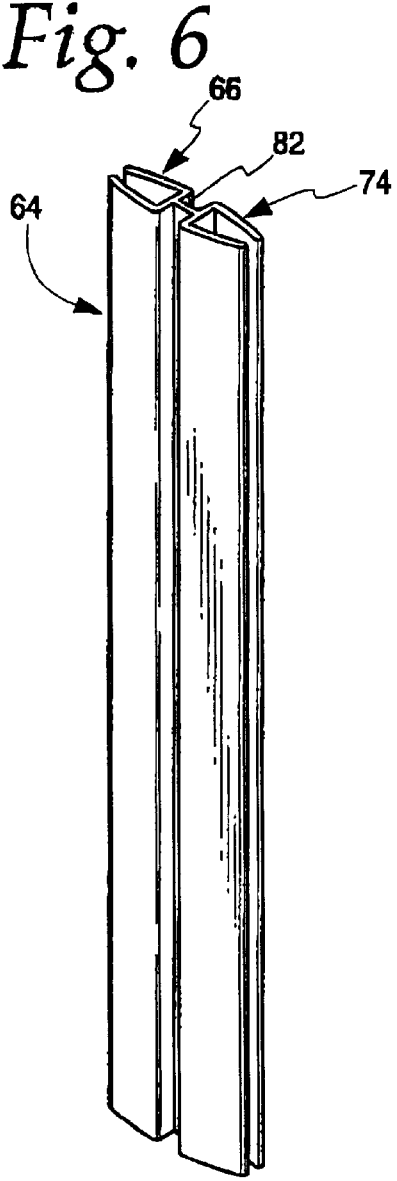
FIG. 6 is an enlarged isometric view of an elongated gap closure extrusion of the present invention.

While the present invention is open to various modifications and alternative constructions, the preferred embodiment shown in the drawing will be described herein in detail. It is understood, however, that there is no intention to limit the invention to the particular form disclosed. On the contrary, the intention is to cover all modifications, equivalent structures and methods, and alternative constructions falling within the spirit and scope of the invention as expressed in the appended claims.

Referring now to FIG. 1, a data transmission pedestal is designated generally by the reference number 10 and includes an elongated housing formed by a cover section 12 and a base section 14. The cover and base sections define an interior chamber 16 with a right side wall 18, a left side wall 20, a rear wall 22 and a front wall 24. The cover and base are removably engaged to one another to allow service access to the interior chamber. In use, the cover and base are installed with much of the base buried or recessed into the ground A horizontal line 26 on the rear wall 22 of the base indicates where ground level will be in relation to the pedestal. The purpose of the pedestal is to protect an underground cable 28 when the cable is brought above ground to connect selected wires in the cable to a service line from a customer's location.

Within the pedestal chamber 16 are a number of terminal blocks, such as the block 30. The terminal blocks are connected to a mounting plate 32. The mounting plate in turn is connected to a conductive metal grounding bracket 36. The mounting plate is supported by the base 14, and the bracket 36, the mounting plate 32 and the terminal blocks 30 are all disposed within the chamber 16 of the pedestal housing for protection against weather, contaminates, tampering and vandalism. For more detail about the structure of the pedestal, reference is made to U.S. Pat. No. 6,198,041, the disclosure of which is incorporated herein by reference.

Referring now to FIGS. 2 and 3, in addition to FIG. 1, the base 14 is described in more detail. The base section includes a front part 37 and a rear part 38. As can be seen, the bottom edge 40 of the base has a scoop-like structure but is otherwise open to receive an underground cable 42. Located toward the bottom of the front wall 24 is a service line slot 44 for receiving a service line 46. As is well known to those skilled in data transmission line work, the cable 42 and the line 46 are both buried underground but are brought above ground level at preselected locations to allow customer service connections. The interior chamber 16 is partitioned so that a passage is formed for the service lines. Both lines, from the cable and service lines, are connected to the terminal blocks 30 which are mounted on the mounting plate 32 as shown in FIG. 1. As mentioned above, it may become desirable to rehab or replace the pedestal housing because of weather, vandalism or other factors. However, it is not desirable to disconnect either the cable or the service lines from the terminal blocks. An advantage of the present invention is that the entire pedestal housing, the cover 12 and the base 14, may be disengaged from the mounting plate 32 and the terminal blocks 30 without disturbing any lines which are attached to the terminal blocks. The present invention allows a quick, easy and inexpensive means for allowing this activity.

Turning now to FIGS. 4–8, the interior chamber 16 is open except for a passage 50 partitioned from the remaining portion of the chamber, within which service lines, such as the service line 46, are located. The passage is formed by an interior surface 52 of the pedestal and two arcuate walls 54, 56 extending from the interior surface 52. The arcuate walls extend away from the interior surface toward each other such that a wall end portion 58 of the wall 54 and a wall end portion 60 of the wall 56 approach each other, but do not touch thereby leaving an elongated gap 62, as best seen in FIGS. 4 and 5.

Figure 7:
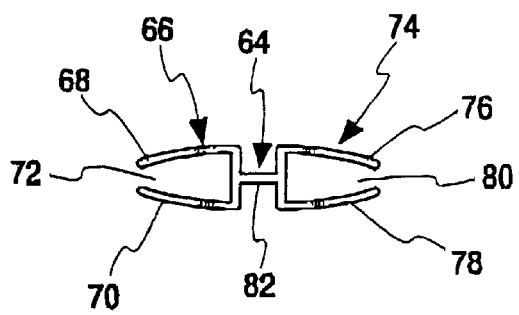
FIG. 7 is a plan view of the gap closure extrusion shown in FIG. 5.
Figure 8:
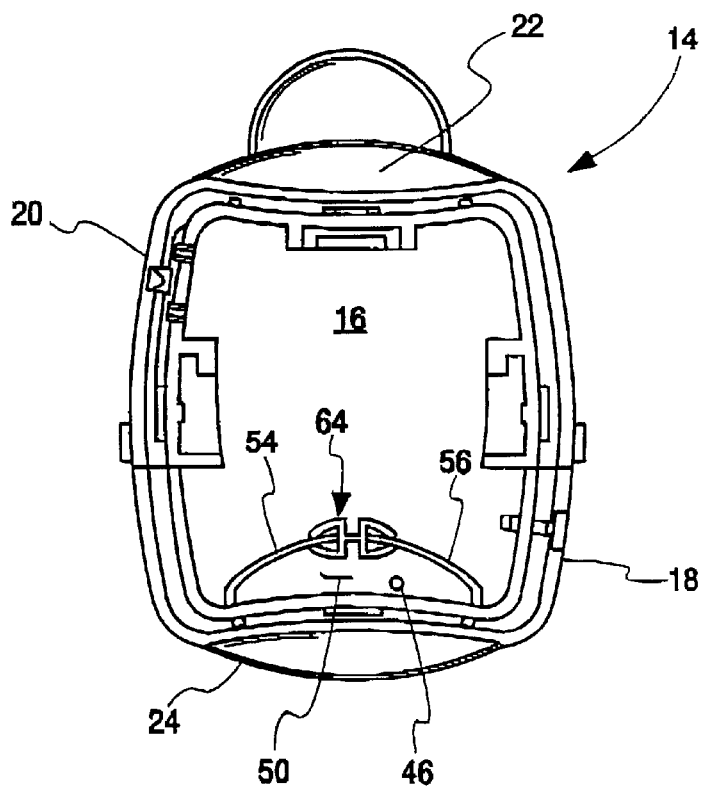
FIG. 8 is a top plan view of the base section of the pedestal as shown in FIG. 4 but with a closed service line passage.

In normal use, a buried service line 46 is received through the slot 44 in the front wall 24 of the pedestal. The line 46 is placed in the passage 50 as the line travels upwardly in the base of the pedestal. The service line then proceeds further into the cover section of the pedestal and connects to the terminal block 30. It is desirable to enclose the service line passage 50 so that the service lines are maintained in the passage. This is done by a gap closure element in the form of an elongated extrusion 64 which is designed to slidably engage the wall end portions 58, 60 for opening and closing the gap 62. Preferably the elongated gap closure element is a synthetic resin extrusion having an extended H-shaped configuration in a plan section view as shown in FIG. 7. The extrusion 64 includes a first pair of arcuate arms 66 formed by the arms 68, 70. These arms are resilient and form an opening 72 to receive the end portion of one of the walls 54, 56. Facing in the opposite direction is a second pair of arms 74 including the arms 76, 78. These create an opening 80 for receiving the other one of the wall portions. Integral with both pairs of arms 66, 74 is a bridge spanning portion 82.

It can now be appreciated that by sliding the gap closure extrusion 64 over the wall end portions 58, 60, the gap 62 is closed and the service lines within the passage 50 are entrapped. However the gap closure extrusion may be easily and quickly removed simply by gripping the bridge portion 82 or one end of the extrusion and lifting the element out of engagement with the walls 54, 56 thereby exposing the gap 62. When this is done, a service line may be moved out of the passage 50 and into the main chamber portion of the pedestal. The mounting bracket 32 may be disengaged from the base allowing the base to be parted and removed. It is possible to remove both the cover section and the base section away from the cable, the service lines and the terminal blocks without disconnecting any of the lines from the terminal blocks. In this way a pedestal may be removed for repair or replacement. A new pedestal may be slipped over the cable, the service lines and the mounting bracket, and the service lines may be reinstalled into the passage 50 without any line disconnection or customer service disruption.

The elongated gap closure extrusion may be made of any suitable material such as polyethylene having a wall thickness of about 0.06 inches. The bridge portion may be about 0.25 inches and the total width of the elongated gap closure extrusion may be about 1.72 inches. The length of the extrusion may be 12 inches. Dimensions of the extrusion may vary according to the size of the pedestal, and instead of one long extrusion, two short extrusions, one at the top of the passage and the other at the bottom may be used.

In operation, a pedestal housing is installed over an above-ground loop of an underground data transmission cable to allow connections between selected lines in the cable and service lines extending to customer locations. Each underground service line is brought into the interior of the pedestal housing by insertion through the slot 44 in the front wall 24 of the pedestal housing. The service line extends through the service line passage 50 before terminating at a preselected location on a terminal block. To ensure that the service line does not slip out of the passage, the gap closure extrusion 64 engages the two walls 54, 56 simply by sliding the two pairs of arms 66, 74 of the extrusion down over the wall end portions 58, 60. Once the gap closure extrusion is fully engaged, the gap 62 is closed or blocked. When it is desired to unblock or open the gap, the gap closure extrusion is simply disengaged from the passage walls by sliding the extrusion in an upward direction. Once the gap closure extrusion is fully disengaged from the passage walls, the gap is opened and the service lines may pass from the passage 50 into the main chamber portion 16 of the pedestal housing. The operation of sliding the gap closure extrusion into and out of engagement with the passage walls may be accomplished without disconnecting any of the service lines. Service lines may be moved back and forth between the chamber 16 and the passage 50 with ease and quickness.

The specification describes in detail an embodiment of the present invention. Other modifications and variations will, under the doctrine of equivalents, come within the scope of the appended claims. For example, the dimensions of the gap 62 may be altered as may the size and shape of the elongated gap closure extrusion 64. The geometry of the pedestal sections may also change. Further, a non-extruded element may be used for a closure, if desired. Still other alternatives will also be equivalent as will many new technologies. There is no desire or intention here to limit in any way the application of the doctrine of equivalents.

What is claimed is:

1. A data transmission pedestal assembly comprising:

an elongated housing having a cover section and a base section and an interior chamber for data transmission equipment;

a service line passage formed within said interior chamber bounded by an interior surface of said housing and two interior walls connected to and extending from said interior surface of said housing, said two interior walls having end portions which are separated from one another by a longitudinally extending gap; and a removable gap closure element for spanning said longitudinally extending gap and for selectively closing and opening said gap.

2. An apparatus as claimed in claim 1 wherein:

said gap closure element is elongated and an extrusion.

3. An apparatus as claimed in claim 2 wherein:

said gap closure element is formed of synthetic resin.

4. An apparatus as claimed in claim 3 wherein:

said gap closure element has two pairs of oppositely disposed arms, each of said pair of arms for gripping a respective interior wall.

5. An apparatus as claimed in claim 2 wherein:

said closure element has two pairs of oppositely disposed arms, each of said pair of arms for gripping a respective interior wall.

6. An apparatus as claimed in claim 5 wherein:

said gap closure element includes a bridge portion located between said two pairs of arms and being connected thereto, said bridge portion for positioning said two pairs of arms to face in opposed directions.

7. An apparatus as claimed in claim 2 wherein:

said gap closure element slidably engages said two interior walls to close said gap and said elongated gap closure element opens said gap by slidably disengaging from said two interior walls.

8. An apparatus as claimed in 7 wherein:

said gap closure element has two pairs of oppositely disposed arms, each pair of arms for gripping a respective interior wall; and said gap closure element includes a bridge portion located between said two of said pairs of arms and being connected thereto, said bridge portion for positioning said two pairs of arms to face in opposite directions.

9. An apparatus as claimed in claim 8 wherein:

said gap closure element is formed of synthetic resin.

10. An apparatus as claimed in claim 2 wherein:

said gap closure element is formed of synthetic resin;

said gap closure element has a cross sectional configuration including two pairs of oppositely disposed arms, said arms having arcuate shapes and said two pairs of arms being spaced apart by a bridge wall.

11. A data transmission pedestal assembly comprising:

an elongated housing having a cover section and a base section and an interior chamber for data transmission equipment, said base section adapted to be partially buried below ground level and having an open bottom adapted to receive underground cable, said base section having a slot for receiving a service line;

a service line passage formed within said interior chamber of said base section bounded by an interior surface of said housing and two arcuate interior walls connected to said interior surface of said housing, said two interior walls having unattached ends extending toward each other and being separated, one wall end portion from the other wall end portion by a longitudinally extending gap, said gap being sized to allow movement of a service line through said gap whereby service lines may be disposed in said service line passage and may be removed therefrom; and a movable elongated gap closure extrusion for spanning said longitudinally extending gap to selectively close and open said gap.

12. An apparatus as claimed in claim 11 wherein:

said movable elongated gap closure extrusion includes two pairs of oppositely disposed arms, each of said pair of arms for gripping a respective wall end thereby closing said gap.

13. An apparatus as claimed in claim 12 wherein:

said movable elongated gap closure extrusion includes a bridge wall located between said two of said pairs of arms and being connected thereto, said bridge portion for positioning said two pairs of arms to face in opposite directions.

14. An apparatus as claimed in claim 13 wherein:

said movable gap closure extrusion slidably engages said end portions of said two interior walls to close said gap and said elongated gap closure extrusion opens said gap by slidably disengaging from said end portions of said two interior walls.

\* \* \* \* \*